United States Patent
Wampole, Sr.

(10) Patent No.: US 6,537,357 B2
(45) Date of Patent: Mar. 25, 2003

(54) TREATMENT OF WOOD, WOOD FIBER PRODUCTS, AND POROUS SURFACES WITH PERIODIC ACID AND IODIC ACID

(76) Inventor: Glenn Paul Wampole, Sr., P.O. Box 894, Taylors, SC (US) 29687

( * ) Notice: Subject to any disclaimer, the term of this patent is extended or adjusted under 35 U.S.C. 154(b) by 0 days.

(21) Appl. No.: 09/788,018

(22) Filed: Feb. 20, 2001

(65) Prior Publication Data

US 2002/0185032 A1 Dec. 12, 2002

(51) Int. Cl.$^7$ .................................................. A01N 59/12
(52) U.S. Cl. ............................... 106/18.35; 106/15.05; 424/667; 427/297; 427/397
(58) Field of Search ............................ 106/15.05, 18.35; 424/667; 427/397, 297

(56) References Cited

U.S. PATENT DOCUMENTS

| | | | |
|---|---|---|---|
| 3,775,047 A | 11/1973 | Weston | 8/37 |
| 3,985,921 A | 10/1976 | Rowell et al. | 427/317 |
| 4,329,383 A | 5/1982 | Joh | 428/36 |
| 4,780,341 A | 10/1988 | Chow | 427/440 |
| 4,804,384 A | 2/1989 | Rowell et al. | 8/121 |
| 5,470,614 A | * 11/1995 | Chen et al. | 106/15.05 |
| 5,910,503 A | * 6/1999 | Mattox et al. | 514/372 |
| 6,008,238 A | * 12/1999 | El A'mma et al. | 514/372 |

FOREIGN PATENT DOCUMENTS

JP       56-47571    *  4/1981

OTHER PUBLICATIONS

Chen et al, "Fungal And Termite Resitance Of Wood Reacted With Periodic Acid or Sodium Periodate", Wood And Fiber Science, 21(2). 1989, pp. 163–168.*

Derwent Abstract No. 1978–37092A, abstract of Japanese Patent Specification No. 53–039127 (Apr. 1978).*

Frequently Asked Questions About Wood, Consumer Information Sheets Approved by US. EPA, American Wood Preservers Institute, Copy Right 2000 (no month).

* cited by examiner

Primary Examiner—Anthony J. Green

(57) ABSTRACT

Treatment and preservation of wood, wood fiber products, and porous surfaces with a solution of periodic acid or iodic acid is provided.

4 Claims, No Drawings

TREATMENT OF WOOD, WOOD FIBER PRODUCTS, AND POROUS SURFACES WITH PERIODIC ACID AND IODIC ACID

FIELD OF INVENTION

This invention relates to a chemical and treatment process for preserving wood and other porous materials.

BACKGROUND OF THE INVENTION

The preservation of wood, wood fiber products and materials with porous surfaces against destruction caused by living organisms such as mold, mildew, fungus, termites, and other insects has been sought since the beginning of civilized time. Coatings, such as paint, are used to shield out the invasion of the organisms. With a "breakdown" of the coating, the organisms can enter and violate the surfaces.

Solvent based penetrates have been effective in preserving wood, wood fiber products, and porous surface materials. The solvent based penetrates are environmentally unsafe due to the carrier solvent contamination and the toxic ingredients. As environmental awareness increased, the technology to treat wood, wood fiber products, and porous materials changed to water-soluble salt mixtures.

Aqueous salt compounds took over the preservative market in the treatment of wood and wood fiber products. Environmental studies in the past few years have proven that the present method of treatment with salts of heavy metals is leaching into the ground and water. As treated wood, wood fiber products and porous surfaces are wet with rain and other water sources; salts are soluabilized and leach to the surrounding environment. As the environment is contaminated, the treated surface is less protected to organism attack. The contamination of the environment is too widespread and of great risk. The potential for directly poisoning humans and animal life is serious.

Set forth below are several U.S. patents directed to wood preservative technology.

U.S. Patent Documents

U.S. Pat. No. 3,775,047 November, 1973 Weston 8/37

U.S. Pat. No. 3,985,921 October, 1976 Rowell et al 427/317I

U.S. Pat. No. 4,329,383 May, 1982 Joh 428/36

U.S. Pat. No. 4,780,341 October, 1988 Chow 427/440

U.S. Pat. No. 4,804,384 February, 1998 Rowell et al 8/181

U.S. Pat. No. 5,470,614 November, 1995 Chem et al 427/440

Coating the wood, wood fiber products and porous surfaces with paints, coatings, and repellants to shield the surface from moisture and organism attack is one type of acceptable treatment. The use of solvent and aqueous penetrating treatments use toxic substances to destroy any organism that attacks the treated surface. My invention offers a unique third method of treatment for the preservation of wood, wood fiber products, and porous surfaces. My invention changes the code of the surface. The treated surface is no longer recognized as a food source or habitat of living organisms. The treated surface is "passed" over.

My invention provides biological and environmental safety in its' use. This invention provides permanent treatment with resistance to leaching. My invention contains no pesticides, heavy metals, or toxic substances. This invention will efficiently treat wood, wood fiber products and porous surfaces by deception and camouflage. My invention replaces treatment by insecticidal and sporocidal salts.

This invention does not require any special application equipment. For general use my invention can be applied by brushing, wiping, spraying or dipping. As long as all surface areas are treated, the protection against organism attack is complete. For commercial use such as the case of wood and wood fiber products for construction materials, the invention can be applied by the pressure and pressure-vacuum extraction equipment, commonly used by the wood preservative industry today.

This invention provides a practical, economical, and sensible method of treating surfaces from damage caused by living organisms. My invention of a treatment for wood, wood fiber products, and porous surfaces has the potential to change the way construction materials are treated. This invention is a new practical concept offering a different approach to treating wood, wood fiber products, and porous surfaces

SUMMARY OF THE INVENTION

The present invention is directed to a treatment for wood, wood fiber products, and porous surfaces using periodic acid, iodic acid, or a combination thereof.

Insects and spores of mold, mildew, and fungus destroy billions of dollars of wood, wood fiber products, and materials with porous surfaces each year. The common method used by industry is treatment with water-soluble salts, which are solubalizing with moisture and leach toxins into our environment.

This invention provides a practical approach to treat wood, wood fiber products, and porous surfaces against the attack of living organisms, such as insects, mold, mildew, and fungus. Insects ingest wood and use wood, wood fiber products, and porous surfaces as protective habitat. Spores from mold, mildew, and fungus use the moist environment of wood, wood fiber surfaces, and porous surfaces as fertile grounds for spore growth. Whether by ingestion or habitat, the destruction by these organisms manifest the same costly result. The premise of this invention is based on the question, "What attracts the organism to the surfaces as a source of food or a place of habitat?" Termites are attracted to wood and products made of wood fiber. Spores find excellent growth habitat in porous surfaces such as masonry mediums, textile fabrics, and porous coatings such as latex. These destructive organisms are attracted to these surfaces.

My invention is based upon the premise that nature has assigned character codes to all matter. All living organisms within our world are constantly decoding the codes of nature. Termites eat wood. Termites do not eat carbon. Mold, mildew and fungus grow on wood and porous surfaces. Spores do not grow on gold. Humans eat potato chips. Humans do not eat plastic. This is the basic principle of code and decodes, which founded this invention. My invention creates a new code for the treated surface.

My invention of a treatment of wood, wood fiber products, and porous surfaces with periodic acid and iodic acid provides s safe, reasonable and economical method to deliver a soluablized element as a treatment of wood, wood fiber products, and porous surfaces. The periodic acid or iodic acid reacts to the surface chemistry and/or the environment to precipate an elemental iodine matrix in the surface structure. The living organism will not recognize the treated surface as food or habitat. The insect or spore will have no interest in the surface medium.

Since the periodic acid and iodic acid are aqueous solutions that are unstable with most all other chemistry, light and heat, the solution will always react and form elemental iodine. As the periodic acid and iodic acid break down in reaction, the hard insoluble iodine solidifies to conform to the surface structure in matrix, therefore giving the surface the character code of iodine.

Once the treatment obtains the state of the element iodine, the matrix is insoluble and as an element cannot be reacted any further. The matrix is set with no potential to leach by moisture. Any energy used to solubilize the matrix would destroy the medium treated. The treated wood, wood fiber product and porous surfaces are laced with an iodine matrix, which cannot leach. This matrix of insoluble iodine also provides moisture control of the surface structure. The porous surface will not take on moisture in the presence of the iodine element. The control of moisture provides a secondary means of organism protection as well as controlling the destruction of the surfaces by mechanical freeze/thaw cycles. The treatment of wood, wood fiber products, and porous surfaces preserves the surface from moisture damage.

This invention provides protection of the surfaces without harm to the environment, without leaching, and without the use of pesticides or heavy metal salts. The treatment is permanent.

DETAILED DESCRIPTION OF INVENTION

The present invention provides for a treatment of wood, wood fiber product, and porous surfaces with an aqueous solution containing periodic acid ($HIO_4*2H_2O$) or an aqueous solution containing iodic acid ($HIO_3$) which will protect the surface from the destruction caused by insects and spores. This invention provides a safe aqueous treatment of wood, wood fiber products, and porous surfaces. Once applied to the surfaces, the invention quickly reacts to the chemistry of the surface and surface environment to form a matrix of a solid insoluble element within the surface structure. The element is permanently fixed within the matrix of the treated surface structure and cannot be removed by natural means.

This invention uses periodic acid ($HIO_4*2H_2O$) and iodic acid ($HIO_3$) as the active ingredients due to their instability to other chemicals. Aqueous solutions containing periodic acid and iodic acid break down in reaction to other chemistry, sunlight, heat, and air. The reaction of the solution of periodic acid or the solution of the iodic acid renders elemental iodine. The iodine forms a matrix within the surface providing the results of the treatment.

Iodine is a nonmetallic halogen element with an atomic number 53, group VII A of the periodic table. Iodine is the least reactive of the halogens. Iodine is not soluble in water in its elemental form. Once the invention reacts to form the iodine matrix, the matrix has no further reaction potential. The treatment is setup permanently in the surface structure.

Iodine is insoluble in water. The iodine matrix is stable against leaching due to rain or water rinse.

In elemental form, iodine is a dense needle like crystal plate with a metallic like luster. The formation of the iodine halogen element is important. As the reaction of the invention produces iodine, the dense plate formation conforms to the surface structure as a hard, non-porous, insoluble, and "fixed" matrix. As an added feature, the iodine matrix will not allow water absorption and provides excellent moisture control of the treated surface.

The invention of a treatment of wood, wood fiber products, and porous surfaces with periodic and iodine acid provides a unique, reasonable and economical approach to protecting surfaces from attack by insects and spore growth.

The treatment process involves applying the periodic acid solution and/or iodic acid solution to the wood or other substrate surface. The water will evaporate leaving a periodic acid ($HIO_4*2H_2O$) or an iodic acid ($HIO_3$) concentrate. The periodic acid or iodic acid in the wood will react to the diol chemistry of the lignin polymers of wood; in other surfaces, the invention will react to other chemical constituents or to ambient heat or light. The results of the reaction are a complex formed within the cell walls of the wood fiber, which creates a matrix of elemental iodine. Within the porous surfaces of other materials, the water evaporates from the periodic acid solution or the iodic acid solution. The periodic acid or iodic acid reacts with the environment to deposit a matrix of elemental iodine within the surface structure. The characteristics of iodine are now established within the treated surface. Insects and spores are not attracted to the "iodine" surface All living organisms are given the ability to recognize codes of a matter. All organisms are decoding every moment of their life. From microscopic spores, insects, animals to humans, all living creatures submit to nature's code system of matter. For example: Humans do not have a desire to eat gold, carbon glass, plastic, or asphalt. This is not due to a taught behavior, but is with us from birth. We have never had a desire to ingest these materials. Termites live in wood and ingest wood fiber as food. Termites have absolutely no desire to ingest iodine. Spores of mold, mildew, and fungus seek shelter and moisture as a habitat for growth. These spores grow on the surface of rock, wood, latex paint, and concrete. Spores have no desire to establish growth on elemented iodine.

A surface treated with an aqueous solution of periodic acid or an aqueous solution of iodic acid will lose its' natural code to the new iodine matrix. The treated surface will appear to be iodine and will not have any appeal to the destructive organism.

Once the elemental state of iodine is established there is no further reactivity possible. The treatment is established without any potential for degradation. Surface preservation has been accomplished. The surface code has been changed to the character of non-desirable dense crystal matrix having no moisture.

The invention of a treatment for wood, wood fiber products and porous surfaces for the protection against damage by living organisms such as insects and spores utilizes an aqueous solution of 0.5% to 50% active periodic acid ($HIO_4*2H_2O$) or an aqueous solution containing 0.5% to 50% active iodic acid ($HIO_3$). The solution may contain from 0.1% to 10% of a fluorinated surfactant with a perfluorinated chain which increases solution stability for increased surface activity. The aqueous solution is wiped, brushed, poured or sprayed onto the wood, wood fiber materials, or porous surface. The surface should be allowed to dry 24 hours allowing the chemical reaction to occur forming the elemental iodine code.

Additionally, the solution may contain between 0.1% to 5% of a 30 mole ethoxylated nonylphenol which improves the solution stability and emulsifying properties.

For treatment of commercial wood and wood fiber materials such as that used in construction industry, the periodic acid solution or iodic acid solution can be applied to the wood by vat dip, pressure treatment and pressure/vacuum extraction equipment. As the water evaporates the periodic acid or iodic acid reacts to the diols within the lignin polymers. The reaction produces the iodine matrix.

Iodine has no natural predators. The treated surface is of no interest to organisms such as insects and spores.

What is claimed is:

1. A process of treating wood with a preservative comprising:
   providing a wood substrate;
   applying to the wood substrate an aqueous solution comprising 0.5% to 50% of an iodic acid, a periodic acid, or a combination thereof;
   0.1% to 10% of a fluorinated surfactant with a perfluorinated chain; and,
   optionally, an effective stabilizing amount of an ethoxylated nonylphenol;
   wherein said aqueous solution reacts with the wood substrate to form an insoluble iodine matrix within the wood substrate, said iodine matrix providing a moisture resistant barrier imparting to the wood preservative properties against termites and decay.

2. A wood preservative solution comprising:
   an aqueous solution comprising 0.5% to 50% of an iodic acid, a periodic acid, or a combination thereof;
   0.1% to 10% of a fluorinated surfactant with a perfluorinated chain; and,
   optionally, an effective stabilizing amount of an ethoxylated nonylphenol.

3. A wood preservative solution consisting essentially of:
   an aqueous solution of 0.5% to 50% of an iodic acid, a periodic acid, or a combination thereof;
   0.1% to 10% of a fluorinated surfactant with a perfluorinated chain; and,
   an effective stabilizing amount of an ethoxylated nonylphenol.

4. A wood preservative solution consisting essentially of:
   a stabilized aqueous solution of 0.5% to 50% of an iodic acid, a periodic acid, or a combination thereof; and,
   about 0.1% to about 10% of a fluorinated surfactant with a perfluorinated chain.

* * * * *